April 12, 1927.
E. W. SMITH
COMBINATION LEVEL
Filed Aug. 2, 1926
1,624,684
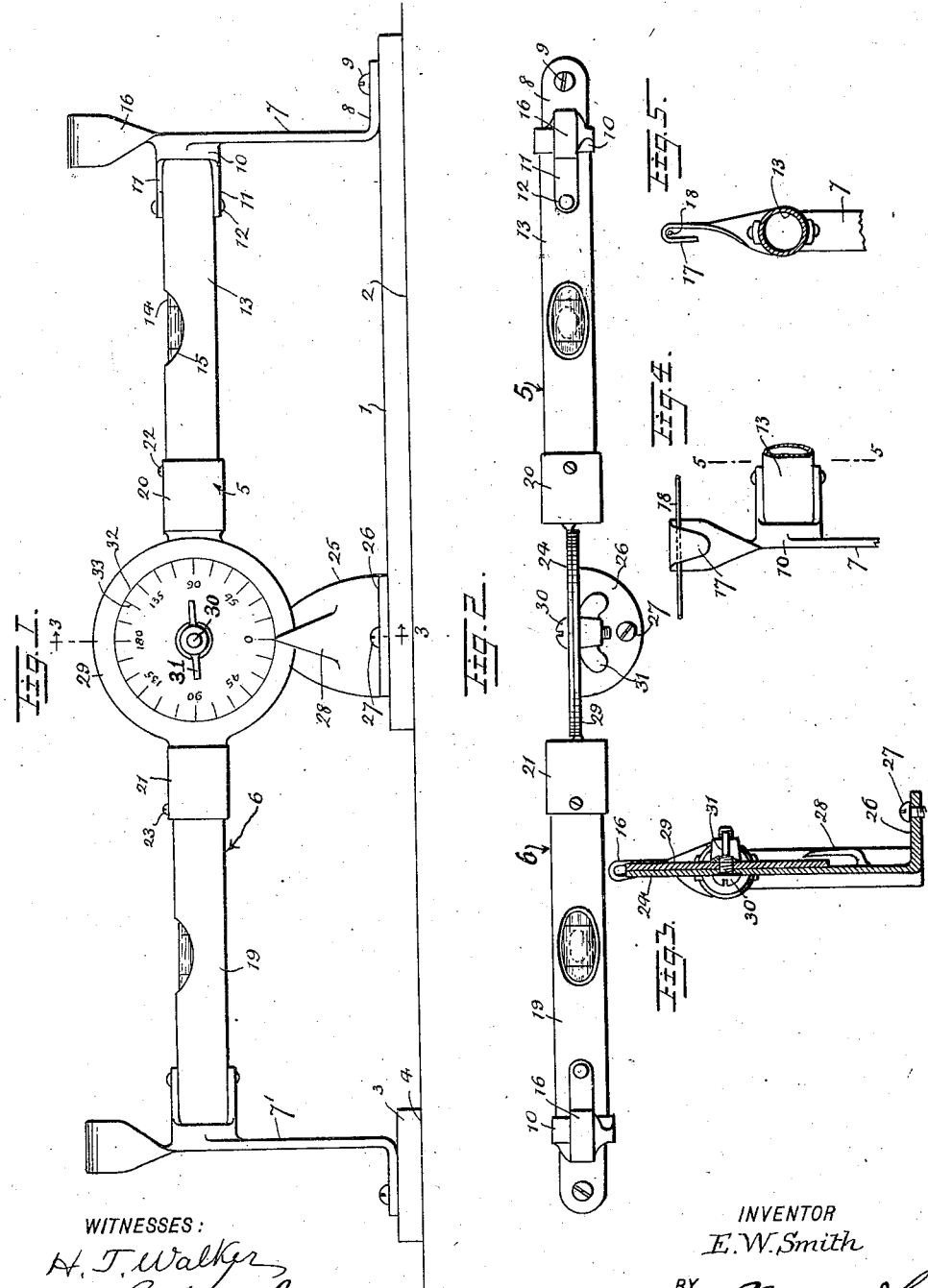
INVENTOR
E. W. Smith
WITNESSES:
BY
ATTORNEYS Patented Apr. 12, 1927.

1,624,684

UNITED STATES PATENT OFFICE.

EUGENE W. SMITH, OF NEW YORK, N. Y.

COMBINATION LEVEL.

Application filed August 2, 1926. Serial No. 126,674.

This invention relates to levels and particularly to an improved combination level having as an object to provide a simple construction while providing a device which may be used in a number of different ways.

Another object of the invention is to provide an improved form of level formed to act at one time as a line level, another time as a surface level and another time as an angle finder.

A further object, more specifically, is the provision of a level structure wherein two level elements are used, one being positioned to remain in a horizontal plane and the other positioned to be swung to different angles from a horizontal plane.

In the accompanying drawing—

Figure 1 is a side view of a level disclosing an embodiment of the invention.

Figure 2 is a top plan view of the level shown in Figure 1.

Figure 3 is a sectional view through Figure 1 on line 3—3.

Figure 4 is a fragmentary view of one end of the level showing the opposite side to that illustrated in Figure 1 and illustrating how the device may be suspended on a wire or other line.

Figure 5 is a sectional view through Figure 4 on line 5—5.

Referring to the accompanying drawing by numerals, 1 indicates a base which may be of wood or other material and which has a lower flat surface 2 adapted to rest on an object when the level is in use. Co-acting with the base 1 is an auxiliary base 3 having a flat surface 4 which falls in the plane of the surface 2 when the device is on a plane surface. Co-acting with the bases 1 and 3 are level members 5 and 6. Member 5 is provided with a leg 7 having a foot 8 secured to base 1 by a screw 9 or other suitable means. Leg 7 near the upper part merges into a socket 10 having arms 11 connected together by a suitable rivet 12, said rivet passing through the casing 13, said casing carrying the transparent member 14 in which the liquid and air bubble are positioned the same presenting a level vial. The casing 13 is cut away at 15 for disclosing part of member 14 whereby the air bubble may be readily observed at any time. Preferably integral with the socket 10 is an extension 16 bent for forming a hook 17 whereby the device may be supported on a line, as for instance, line 18. The level member 6 is also provided with a leg 7' which is constructed identically with leg 7 and which is provided and associated with members of the same kind, said leg 7', however, being riveted to the casing 19. It will be noted, however, that casing 19 and associated parts are like casing 13. The casings 13 and 19 extend into the sockets 20 and 21 respectively and are held therein preferably by suitable clamping screws 22 and 23. The socket 20 has a disk-shaped integral extension 24 which is provided with a leg 25 having a foot 26 secured to base 1 in any suitable manner, as for instance, by the screw 27. The leg 25 is also provided with a pointer 28 which may be integral therewith or may be separate and rigidly secured in place. The socket 21 is provided with an integral extension 29 which fits over the extension 24 and is clamped thereto by a bolt 30 having a wing nut 31. The clamping action of this bolt may lock the parts firmly together or may merely hold the parts together so that they will not accidentally move, though the parts are capable of movement by manually shifting one part in respect to the other. The extension 29 is provided with a dial 32 having a number of graduations 33 which co-act with the pointer 28 for indicating the position of the level members 5 and 6 or rather indicate the condition of one level member in respect to the other.

As shown in Figure 1, the pointer 28 is opposite zero and this indicates that the level member 6 is in direct line with the level member 5. If desired, level member 5 with its base 1, could be left in the position shown in Figure 1 and level member 6 swung upwardly to a forty-five degree angle. This angle would be indicated by the fact that the dial 32 moves with the extension 29 and, consequently, would move the graduations 45 opposite pointer 28. When the parts are adjusted to this position, the wing nut 31 could be operated for firmly clamping the parts together so that the surface 2 would be, for instance, in a horizontal plane and the surface 4 would be at forty-five degrees to a horizontal plane. In this way, an accurate angle may be secured for sawing boards or for laying out structural work. It is, of course, evident that the level 6 could be shifted to other angles without departing from the spirit of the invention.

When the device is to be used as a line level, members 5 and 6 are moved to a position in alignment or until pointer 28 is opposite zero. The wing nut 31 is then tightened until the parts are sufficiently clamped together to act as a unit. The hooks 17 at each end of the device are then fitted over the wire or other line. By observing the position of the bubble in the respective members 5 and 6, the level of the line may be readily determined.

What I claim is:

1. A combination level comprising a pair of tubular members each carrying level vials, a pair of supporting legs for one of said tubular members, a single supporting leg for the other of said tubular members, means for pivotally connecting together said tubular members so that the tubular member carrying the single leg may be swung at an angle to the other tubular member, and a base connected with the two legs associated with one of the tubular members.

2. A level comprising a base, a tubular member, a pair of legs connected with said tubular member and with said base, said tubular member having a notch at one point, a level vial in said tubular member and exposed through said notch, a pointer on one of said legs, an auxiliary tubular member constructed substantially identical with the first mentioned tubular member pivotally connected thereto at one end, a dial mounted on one end of said auxiliary tubular member co-acting with said pointer for indicating the relative angular position of the auxiliary tubular member.

3. A level comprising a base, a tubular member, a pair of legs connected with said tubular member and with said base, one of said legs being formed with a line receiving hook, said hook being positioned at the opposite end of the leg to said base, said tubular member having a notch at one point, a level vial in said tubular member exposed through said notch, a pointer on one of said legs, an auxiliary tubular member constructed substantially identical with the first mentioned tubular member pivotally connected thereto at one end, a leg connected to the free end of said auxiliary tubular member formed with a line receiving hook substantially identical in form with the first mentioned hook, a dial mounted on one end of said auxiliary tubular member co-acting with said pointer for indicating the relative angular position of the auxiliary tubular member, and means for locking the tubular member and the auxiliary tubular member against relative movement.

EUGENE W. SMITH.